US012452220B2

(12) United States Patent
Underwood et al.

(10) Patent No.: US 12,452,220 B2
(45) Date of Patent: Oct. 21, 2025

(54) EFFICIENT KEY MANAGEMENT IN DISTRIBUTED APPLICATION

(71) Applicant: Hewlett Packard Enterprise Development LP, Spring, TX (US)

(72) Inventors: Keith D. Underwood, Powell, TN (US); Duncan Roweth, Bristol (GB)

(73) Assignee: Hewlett Packard Enterprise Development LP, Spring, TX (US)

( * ) Notice: Subject to any disclaimer, the term of this patent is extended or adjusted under 35 U.S.C. 154(b) by 159 days.

(21) Appl. No.: 18/479,601

(22) Filed: Oct. 2, 2023

(65) Prior Publication Data

US 2024/0121228 A1 Apr. 11, 2024

Related U.S. Application Data

(60) Provisional application No. 63/379,079, filed on Oct. 11, 2022.

(51) Int. Cl.
*H04L 9/40* (2022.01)
*H04L 1/18* (2023.01)
*H04L 9/08* (2006.01)
*H04L 9/32* (2006.01)

(52) U.S. Cl.
CPC ............ *H04L 63/0435* (2013.01); *H04L 1/18* (2013.01); *H04L 9/0891* (2013.01); *H04L 9/3236* (2013.01)

(58) Field of Classification Search
CPC ..... H04L 63/0435; H04L 1/18; H04L 9/0891; H04L 9/3236
See application file for complete search history.

(56) References Cited

U.S. PATENT DOCUMENTS

| | | |
|---|---|---|
| 9,781,058 B1 | 10/2017 | Addepalli et al. |
| 10,116,567 B1 | 10/2018 | Singh et al. |
| 2007/0257813 A1* | 11/2007 | Vaswani ............... G01D 4/004 340/870.02 |
| 2009/0046815 A1 | 2/2009 | Oh et al. |
| 2009/0300209 A1 | 12/2009 | Elzur |
| 2010/0265821 A1 | 10/2010 | Schmidt et al. |
| 2012/0030451 A1 | 2/2012 | Pong et al. |
| 2012/0147750 A1 | 6/2012 | Pelletier et al. |
| 2012/0328092 A1* | 12/2012 | Kudo ..................... B25J 9/0003 380/28 |
| 2014/0301195 A1 | 10/2014 | Briscoe et al. |

(Continued)

*Primary Examiner* — Techane Gergiso
(74) *Attorney, Agent, or Firm* — Yao Legal Services, Inc.

(57) ABSTRACT

An apparatus facilitating efficient key refresh in a node is provided. During operation, the apparatus can determine a collective operation initiated by the node. The node can include a processor and can be in a distributed system comprising a plurality of nodes. The collective operation can be performed by a subset of the plurality of nodes in conjunction with each other. The apparatus can generate a new key based on a previous key maintained at the apparatus. Here, a respective key can be used for encrypting an inter-node packet in the distributed system. The apparatus can maintain the new and previous keys for the duration of the collective operation. Either of the new and previous keys can be used for decrypting messages received at the apparatus from other nodes of the distributed system. Upon determining a threshold point of the collective operation, the apparatus can discard the previous key.

20 Claims, 10 Drawing Sheets

(56) References Cited

U.S. PATENT DOCUMENTS

| | | |
|---|---|---|
| 2019/0140962 A1 | 5/2019 | Thottethodi et al. |
| 2019/0171612 A1 | 6/2019 | Shahar et al. |
| 2020/0084150 A1 | 3/2020 | Burstein et al. |
| 2020/0127981 A1* | 4/2020 | Yang ................ H04L 63/068 |
| 2020/0220713 A1* | 7/2020 | Li ............................ H04L 9/14 |
| 2020/0259799 A1* | 8/2020 | Li ........................ H04L 9/0897 |
| 2020/0279060 A1* | 9/2020 | McGraw ............. G06F 21/6209 |
| 2020/0374745 A1 | 11/2020 | Sayenko et al. |
| 2021/0112002 A1 | 4/2021 | Pan et al. |
| 2022/0103465 A1 | 3/2022 | Zhu et al. |
| 2022/0103484 A1 | 3/2022 | Penaranda et al. |
| 2022/0124035 A1 | 4/2022 | Lee et al. |
| 2022/0200801 A1* | 6/2022 | Potlapally ........... H04L 63/0428 |
| 2022/0413886 A1* | 12/2022 | Griffy ................... G06F 21/602 |
| 2023/0084956 A1* | 3/2023 | Robison ............... H04L 9/3236 |
| | | 713/2 |
| 2023/0185606 A1* | 6/2023 | Menes .................. G06F 9/5027 |
| | | 718/102 |
| 2023/0281153 A1 | 9/2023 | Hansen |
| 2023/0336490 A1 | 10/2023 | Arslan et al. |
| 2023/0376450 A1 | 11/2023 | Ranadive et al. |

\* cited by examiner

EFFICIENT KEY MANAGEMENT IN DISTRIBUTED APPLICATION

RELATED APPLICATION

This application claims the benefit of U.S. Provisional Application No. 63/379,079, titled "Systems and Methods for Implementing Congestion Management and Encryption," by inventors Keith D. Underwood and Duncan Roweth, filed 11 Oct. 2022.

STATEMENT OF GOVERNMENT-FUNDED RESEARCH

This invention was made with Government support under Contract Number H98230-23-C-0350 awarded by the Maryland Procurement Office. The Government has certain rights in this invention.

BACKGROUND

Field

The present disclosure relates to a communication network. More specifically, the present disclosure relates to a method and system for efficiently generating and refreshing encryption keys for a distributed application operating on a plurality of nodes spanning across the network.

BRIEF DESCRIPTION OF THE FIGURES

In the figures, like reference numerals refer to the same figure elements.

DETAILED DESCRIPTION

Figure 1A:
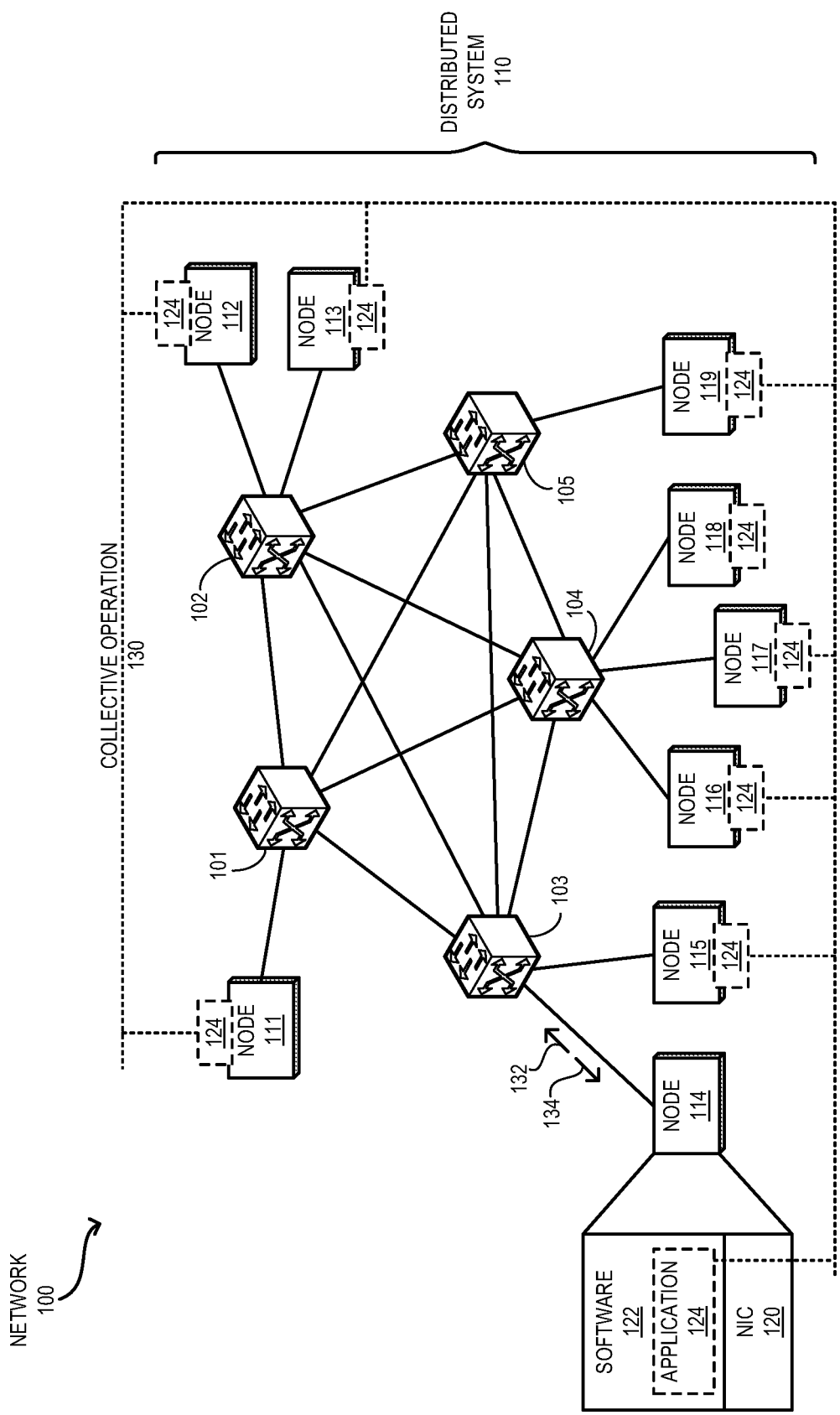
FIG. 1A illustrates an example of efficiently refreshing keys for a distributed application, in accordance with an aspect of the present application.

As applications become progressively more distributed, high-performance computing (HPC) can often be used to facilitate efficient computation on the nodes running an application. In general, a distributed application can execute a collective operation on a large number of nodes. When the respective outputs of individual instances of the collective operations are combined, a target outcome can be reached. For example, a node can obtain packets comprising data associated with the collective operation from a number of downstream nodes and combine them to generate a single packet that can be provided to an upstream node. The collective operation can include a synchronization operation, which can also be referred to as a barrier, and can perform some mathematical function that combines or sorts the values provided by the nodes into a single value.

Hence, various types of collective operations associated with a distributed application can require data sharing among nodes. To ensure secure exchange, the data exchanged among the nodes can be encrypted with an encryption key. Encryption may require distributing keys among the nodes. However, distributing keys among a set of nodes distributed across a network can be challenging. As a result, in addition to conventional performance issues, such as processing and distribution latency, a distributed application may face other issues, such as scalability and efficiency.

The aspects described herein address the problem of efficiently providing a series of keys to mitigate replay attacks by (i) generating a new (or next) key based on an existing (or old) key in a distributed way; (ii) triggering the key generation for a respective collective operation to bypass additional key distribution, and (iii) maintaining both new and old keys during the collective operation and transitioning to the new key afterward. Each node can deploy a key generation function (e.g., a hash function) that allows the node to generate the new key, which can be referred to as refreshing the key, without an input from another node. As a result, each node can independently refresh the key in the series of keys. Furthermore, since collective operations can be performed by the distributed application, piggybacking on the collective operation can efficiently refresh the key without significant overhead.

With existing technologies, HPC can facilitate distributed computation on a group of processing nodes. The distributed computation can include a collective operation that can be performed among the nodes. Because the collective operation relies on the propagation and accumulation of data, nodes participating in collective operation can form a tree to facilitate the propagation and accumulation. Hence, the nodes of the collective operation can form a tree. A respective node can share the results of the local computations of the collective operation with an upstream node, which in turn, may incorporate the results of all downstream nodes. This gradual accumulation of results can produce a global result at a root node. When the global result is generated, the root node may instruct the downstream nodes to perform a subsequent computation. The collective operation can also include a barrier that can prevent computation beyond a point until all nodes of the collective operation reach the point. Alternatively, the collective operation can be associated with a number that can be used to determine that all nodes have reached the point.

Typically, all communication including that for the collective operation of a distributed application can be secured with key-based encryption. However, inter-node communication can still be vulnerable to "replay attacks." A malicious entity, such as a malicious node, can capture a set of packets. Even if these packets are encrypted, the malicious entity can replay or insert these captured packets into the computation of the distributed application. As a result, if the replay attack is successful, the global result generated by the distributed application can become incorrect. To prevent such attacks, the key that facilitates secure communication between a respective node pair needs to be updated periodically. Provisioning encryption keys for a distributed application running on a large number of nodes can be challenging. For example, running a key exchange protocol among each pair of nodes for the distributed application can become infeasible due to the significant communication overhead of the protocol.

To address this problem, the encryption keys used to secure the data exchanged for all communication, which can include the communication associated with the collective operation, can be refreshed so that each key is active for a limited period. Each node participating in the collective operation can independently and hence, parallelly, refresh the key. Refreshing the key can include generating a new (or next key) from the current (or old) key using a key generation technique, such as a cryptographic hash function. Since each node independently refreshes the key, a sequence of refreshing operations can lead to a series of keys, each being active for a limited period. Furthermore, the distributed and independent generation of the keys can eliminate the requirement for pair-wise key exchange. Hence, the distributed application can efficiently secure the data exchanged for the collective operation with low overhead.

During operation, to send a piece of data to another node, a node can encrypt the data with a key, generate a packet, and incorporate the encrypted data in the payload of the packet. The encrypted data can remain valid for the collective operation while the key remains valid. If a replay attack is attempted by capturing the packet, the encrypted data in the packet may not be valid after a while because the key associated with the payload of the packet may no longer be active. As a result, if the packet is replayed after the expiration of the key, a node receiving the replayed packet can discard it. In this way, the independent and distributed key refresh can mitigate a replay attack.

To further enhance the key refresh process, the keys can be refreshed either periodically (e.g., at predetermined intervals) or when the nodes perform the collective operation, such as a barrier synchronization. The barrier synchronization can typically be performed based on a tree. When a node enters a barrier, the node can pause all subsequent operations until all nodes participating in the collective operation have entered the barrier (i.e., completed computations up to a certain point). Upon entering the barrier, the node can independently refresh the key while keeping the old (or previous) key active. Here, the nodes can parallelly refresh the key. As a result, any data encrypted using either the existing or new key can remain valid. When the node sends a packet associated with the barrier to an upstream node, the node can piggyback a piece of information indicating the key refresh event and encrypt the payload with the old key. The information can be the barrier packet itself or an indicator value (e.g., a predetermined value). The upstream node can independently enter the barrier, determine the information from the packet, and refresh the key.

This process may continue until the root node of the tree enters the barrier. The root node can then send a confirmation packet (e.g., an acknowledgment packet) to the downstream nodes. A respective downstream node can then exit the barrier and propagate the confirmation packet further downstream until the leaf nodes of the tree are reached. Hence, a node exits the barrier when all nodes have entered the barrier, which indicates all nodes have transitioned to the new key. The node can then discard the old (or previous) key because all subsequent communication is expected to be based on the new key. In this way, the keys used for the collective operation can be refreshed in an efficient and distributed way.

Furthermore, if a packet associated with the barrier is lost, the lost packet can time out based on the network protocol used to send the packet. The sender node can then retransmit the packet. Since both keys are maintained until the barrier is complete, when the packet is retransmitted, the sender node can use the old key to encrypt the data. Hence, the receiver node can receive the packet and decrypt the payload using the old key. Therefore, maintaining both keys until all nodes refresh the key can support the retransmission of lost packets. The network interface card (NIC) of a node can be responsible for encrypting data from the distributed application running on the node and generating packets comprising the encrypted data. Therefore, if the NIC receives a command to initiate a collective operation from the distributed application, the NIC can initiate and manage the key refresh process.

In this disclosure, the term "switch" is used in a generic sense, and it can refer to any standalone or fabric switch operating in any network layer. "Switch" should not be interpreted as limiting examples of the present invention to layer-2 networks. Any device that can forward traffic to an external device or another switch can be referred to as a "switch." Any physical or virtual device (e.g., a virtual machine or switch operating on a computing device) that can forward traffic to an end device can be referred to as a "switch." Examples of a "switch" include, but are not limited to, a layer-2 switch, a layer-3 router, a routing switch, a component of a Gen-Z network, or a fabric switch comprising a plurality of similar or heterogeneous smaller physical and/or virtual switches.

The term "packet" refers to a group of bits that can be transported together across a network. "Packet" should not be interpreted as limiting examples of the present invention to a particular layer of a network protocol stack. "Packet" can be replaced by other terminologies referring to a group of bits, such as "message," "frame," "cell," "datagram," or "transaction." Furthermore, the term "port" can refer to the port that can receive or transmit data. "Port" can also refer to the hardware, software, and/or firmware logic that can facilitate the operations of that port.

FIG. 1A illustrates an example of efficiently refreshing keys for a distributed application, in accordance with an aspect of the present application. A network 100 can include a number of switches and devices, and may include heterogeneous network components, such as layer-2 and layer-3 hops and tunnels. In some examples, network 100 can be an Ethernet, InfiniBand, or other networks, and may use a corresponding communication protocol, such as Internet Protocol (IP), FibreChannel over Ethernet (FCoE), or other protocol. Network 100 can include a plurality of switches 101, 102, 103, 104, and 105. These switches can form a switch fabric for facilitating HPC in network 100. A respective switch in network 100 can be associated with a media access control (MAC) address and an Internet Protocol (IP) address.

A subset of the switches in network 100 can be coupled to each other via respective tunnels. Examples of a tunnel can include, but are not limited to, VXLAN, Generic Routing Encapsulation (GRE), Network Virtualization using GRE (NVGRE), Generic Networking Virtualization Encapsulation (Geneve), Internet Protocol Security (IPsec), and Multiprotocol Label Switching (MPLS). The tunnels in network 100 can be formed over an underlying network (or an underlay network). The underlying network can be a physical network, and a respective link of the underlying network can be a physical link. A respective switch pair in the underlying network can be a Border Gateway Protocol (BGP) peer. A VPN, such as an Ethernet VPN (EVPN), can be deployed over network 100.

A plurality of end hosts or nodes can be coupled to the switches of network 100. For example, node 111 can be coupled to switch 101; nodes 112 and 113 can be coupled to switch 102; nodes 114 and 115 can be coupled to switch 103; nodes 116, 117, and 118 can be coupled to switch 104, and node 119 can be coupled to switch 105. A respective switch and node can be equipped with a NIC. A NIC of a device can provide one or more ports for the device and can form a link coupling the NIC of another device. A respective node can run an instance of a distributed application 124. Hence, these nodes can form a distributed system 110 running distributed application 124. For example, node 114 can be in distributed system 110 and can run distributed application 124 on its software 122. Software 122 can include one or more of: an operating system, a virtual machine (VM), a container, and a management application.

The nodes of network 100 can facilitate distributed computation for distributed application 124 by sharing data via network 100. The distributed computation can include a collective operation 130 that can be performed among a subset of nodes of network 100 (denoted with dotted lines). A node, such as node 118, may not participate in collective operation 130 while another node, such as node 115, may not participate in another collective operation. Examples of collective operation 130 can include, but are not limited to, a barrier (e.g., a NULL operation that does involve payload data in a packet); MIN, MAX, and SUM operations on integer or floating point data types; MINMAXLOC operation (which returns the locations of minimum and maximum values found in an array) on integer or floating point values and integer indices; bitwise AND, OR, and XOR operation on integer data types; and reproducible sum operations on floating point data types. The data types supported by collective operation 130 can include, but are not limited to, integers, floating points, and bitmaps.

The nodes participating in collective operation 130 can form a tree. A respective node can share a local piece of information of collective operation 130, such as information indicating a barrier or the results of the local computations, with an upstream node. The upstream node may incorporate the information from all downstream nodes. This gradual accumulation of information can produce a global piece of information at a root node. Typically, all communication, including that for collective operation 130, can be secured with key-based encryption. However, inter-node communication can still be vulnerable to replay attacks. To prevent such attacks, the key that facilitates secure communication between a respective node pair needs to be updated frequently. Provisioning encryption keys for distributed application 124 can be challenging. For example, running a key exchange protocol among each pair of nodes for distributed application 124 can become infeasible due to the significant communication overhead of the protocol.

To address this problem, the encryption keys for collective operation 130 can be refreshed so that a key is active for a limited period. Each node participating in collective operation 130 (e.g., all nodes in network 100 except node 118) can independently generate a new key from the old key using a cryptographic hash function. Consequently, these nodes can generate the new key in parallel. A replay attack can be attempted on collective operation 130 by capturing a packet associated with collective operation 130. However, if the key encrypting the payload of the packet is refreshed, the key may not be valid because the key may no longer be active. To further enhance the refresh process, the keys can be refreshed when the nodes perform collective operation 130.

For example, to initiate collective operation 130 on node 114, distributed application 124 can issue a command to NIC 120 of node 114. NIC 120 can then generate a packet 132 associated with collective operation 130 and send it to switch 103. For example, if collective operation 130 is barrier synchronization, packet 132 can indicate the initiation of the barrier. Distributed application 124 may pause all subsequent operations until all nodes participating in collective operation 130 have entered the barrier. Here, collective operation 130 can be a blocking collective operation. Upon initiating collective operation 130, node 114 can independently transition to the new key while keeping the old key active. The transition to the new key can also be performed based on non-blocking collective operations as well.

As a result, any packet with a payload encrypted using the old key can remain valid. When NIC 120 sends packet 132 associated with collective operation 130 to the upstream node via switch 103, NIC 120 can piggyback a piece of information in packet 132 indicating the initiation of key refresh. When NIC 120 receives a confirmation packet 134 from the root node for collective operation 130 via switch 103, NIC 120 can determine that collective operation 130 has reached a threshold point. The threshold point can include the completion of a blocking collective operation or a sufficient progress in a non-blocking collective operation. NIC 120 can then transition to the new key. For example, NIC 120 can determine that all nodes have entered the barrier, exit the barrier, and transition to the new key. Nic 120 can discard the old key because all subsequent communication is expected to be based on the new key. In this way, the keys can be refreshed in an efficient and distributed way in network 100.

Figure 1B:
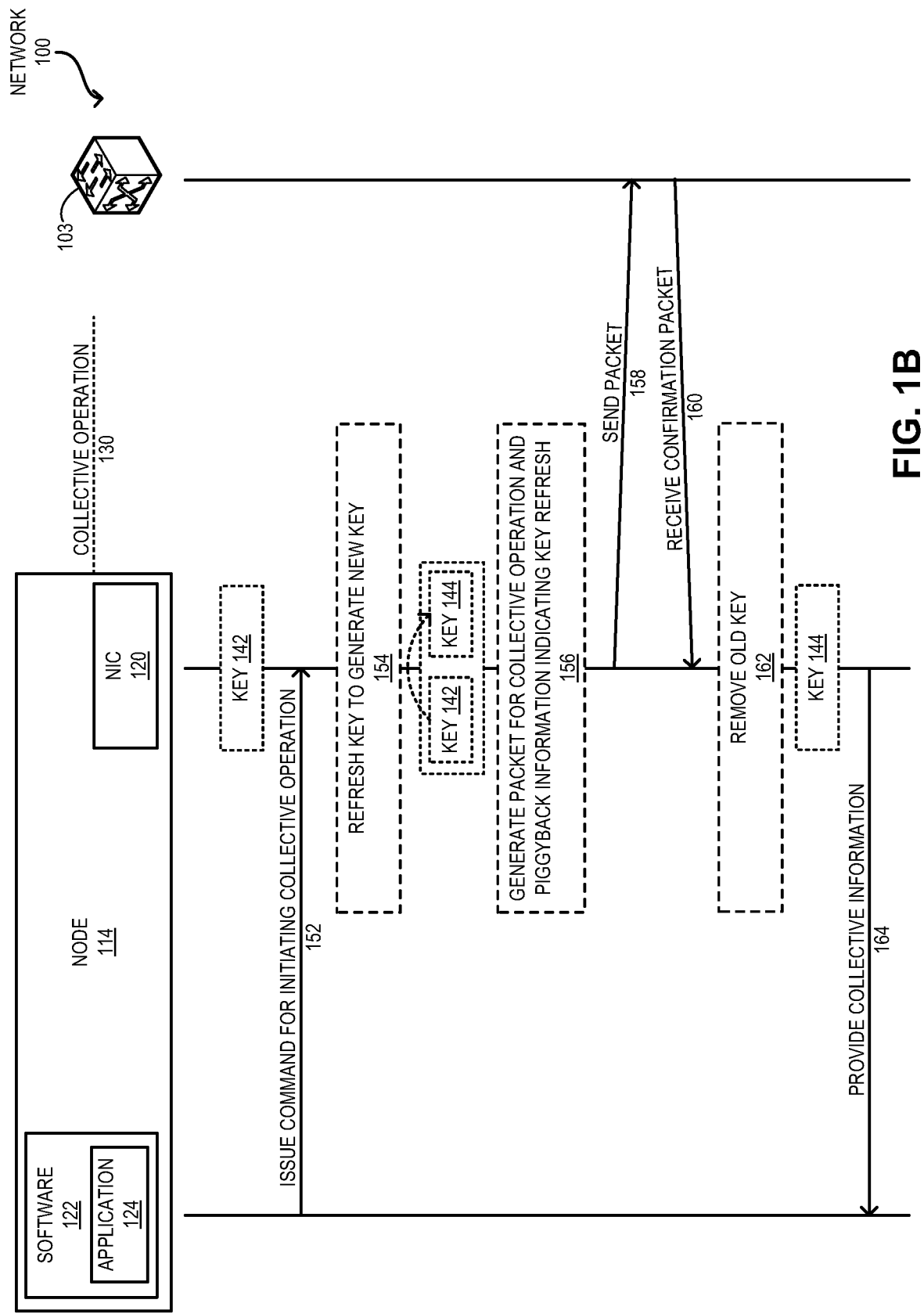
FIG. 1B illustrates an example of a distributed application on a node, in accordance with an aspect of the present application.

FIG. 1B illustrates an example of a distributed application on a node, in accordance with an aspect of the present application. Suppose that NIC 120 operates using an existing key 142 for distributed application 124. During operation, distributed application 124 can issue a command to NIC 120 for initiating collective operation 130 (operation 152). NIC 120 can use a network library to facilitate collective operation 130. Examples of a network library can include, but are not limited to, a Message Passing Interface (MPI), a partitioned global address space library (e.g., OpenSHMEM), and a Collective Communication Library (CCL) (e.g., the NVIDIA© CCL or NCCL).

NIC 120 can then refresh the key to generate the new (or next) key (operation 154). Accordingly, NIC 120 can generate new key 144 by applying a cryptographic hash function on key 142. NIC 120 can then maintain both keys 142 and 144 as valid keys. NIC 120 can also generate a packet for the collective operation and piggyback a piece of information indicating the key refresh event (operation 156). The piece of information can be the initiation of collective operation 130 or a predetermined value included in the packet. NIC 120 can then send the packet to switch 103 for distributing it to the upstream node (operation 158). The packet can be propagated to the root node.

Subsequently, NIC 120 can receive a confirmation packet (e.g., indicating the completion of the barrier synchronization or sufficient progress for a non-blocking collective operation) (operation 160). At this point, NIC 120 can determine that all upstream nodes have transitioned to key 144. NIC 120 can then remove old key 142 (operation 162). Before the next key refresh event, all data exchanged for distributed application 124 can then be encrypted using key 144. NIC 120 may also provide any collective information to distributed application 124 (operation 164). The collective information can include an acknowledgment of collective operation 130 reaching a threshold point. For example, the collective information can be an indicator indicating that all nodes have entered the barrier. Because collective operation 130 relies on the propagation and accumulation of data, nodes participating in collective operation 130 can form a network topology, such as a tree, to facilitate the propagation and accumulation. Examples of the network topology can include, but are not limited to, a tree topology, a grid topology, and a hypercube topology.

Figure 2A:
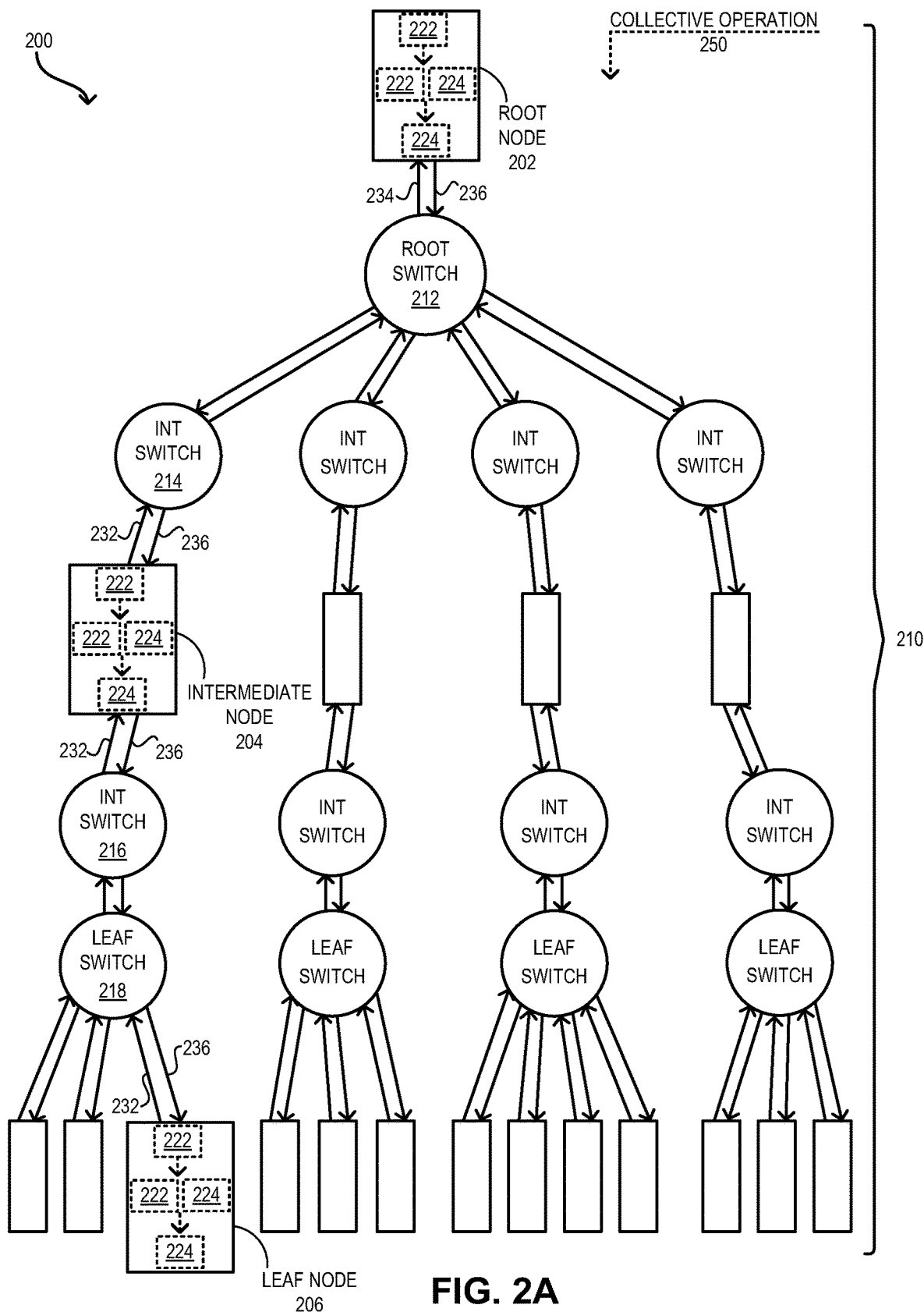
FIG. 2A illustrates an example of refreshing a key based on a network topology associated with a collective operation, in accordance with an aspect of the present application.

FIG. 2A illustrates an example of refreshing a key based on a network topology associated with a collective operation, in accordance with an aspect of the present application. In this example, a collective operation 250 can be performed based on a tree 200. A tree for collective operation 250 can be constructed with nodes, switches, or both. In this example, tree 200 can include a number of nodes and switches. Collective operation 250 can be performed by the respective NICs of the nodes, such as nodes 202, 204, and 206, of tree 200. These nodes can then form a distributed system 210. The encryption keys used to secure the data exchanged for collective operation 250 can be refreshed so that each key is active for a limited period.

Suppose that, prior to the initiation of collective operation 250, the current key used by the nodes of tree 200 is key 222. Here, the same key 222 can be used by all nodes in tree 200. During operation, node 206, which can be a leaf node of tree 200, can initiate collective operation 250 (e.g., can enter a barrier). Node 206 can then generate a packet 232. If collective operation 250 is barrier synchronization, packet 234 can be indicative of the barrier. On the other hand, if collective operation 250 includes computation (e.g., an MPI reduce operation), packet 232 can include the data generated by the computation performed by node 206. It should be noted that the key can be refreshed using collective operation 250 regardless of its association with computation or blocking. Node 206 can then encrypt the data using key 222 and incorporate the encrypted data in the payload of packet 232. The encrypted data can remain valid for collective operation 250 while key 222 remains valid.

Node 206 can forward packet 232 to upstream node 204 of tree 200, which can be an intermediate node of tree 200. Leaf switch 218 coupling node 206 can receive packet 232 and forward it to node 204 via an intermediate switch 216 coupling node 206. Here, node 204 can be the upstream node for node 206 with respect to tree 200. In the physical network, nodes 204 and 206 can be coupled to the same switch. Switches 216 and 218 can then be the same physical switch. Therefore, the switches in tree 200 can be representative of the topology for collective operation 250. Multiple switches shown in tree 200 can then be the representation of the same physical switch.

Node 206 can refresh the keys either periodically (e.g., at predetermined intervals) or when node 206 initiate collective operation 250, such as a barrier synchronization. When 206 initiates collective operation 250, node 206 can independently refresh key 222, which includes applying a cryptographic hash function to key 222 to generate a new key 224. Node 206 can then actively maintain both keys 222 and 224. As a result, any data encrypted using either key 222 or 224 can remain valid. When node 206 sends packet 232 to node 204, node 206 can piggyback a piece of information indicating the key refresh event and encrypt the payload with key 222. The information can be packet 232 itself or an indicator value (e.g., a predetermined value).

Node 204 can independently initiate collective operation 250 (e.g., can enter the barrier). Upon receiving the piggybacked information in packet 232, node 204 can refresh key 222 to generate key 224. Node 204 can then actively maintain both keys 222 and 224. If collective operation 250 includes a computation operation, node 204 can perform the computation on the data received from a plurality of downstream nodes, such as node 206. Node 204 can then generate a packet 234. If collective operation 250 is barrier synchronization, packet 234 can be indicative of the barrier. On the other hand, if collective operation 250 includes computation, packet 234 can include the data generated by the computation performed by node 204. Node 204 can then encrypt the data using key 222, incorporate the encrypted data in the payload of packet 234. Node 204 can also piggyback a piece of information indicating the key refresh event and encrypt the payload with the old key.

This process may continue until root node 202 of tree 200 initiates collective operation 250. For example, intermediate switch 214 coupling node 204 can receive packet 234 and forward it to node 202 via a root switch 212 coupling node 202. Node 202 can independently initiate collective operation 250. Upon receiving the piggybacked information in packet 234, node 202 can refresh key 222 to generate key 224 based on the piggybacked information in packet 234. Node 204 can then actively maintain both keys 222 and 224. If collective operation 250 includes a computation operation, node 202 can perform the computation on the data received from a plurality of downstream nodes, such as node 204. When node 202 enters the barrier or performs the computation (e.g., has made sufficient progress), node 202 can determine that all nodes of tree 200 have refreshed the key and hence, have generated key 224. Node 202 can then discard key 222 and use key 224 for all subsequent communication that may occur before the next key refresh.

Node 202 can then generate a confirmation packet 236. If collective operation 250 is barrier synchronization, packet 236 can indicate that all nodes have entered the barrier. On the other hand, if collective operation 250 includes computation, packet 236 can be an acknowledgment and may include the results of the computation and an instruction for further computation. Node 204 may encrypt the data associated with the computation using key 224 and incorporate the encrypted data in the payload of packet 236. A respective downstream node can receive packet 236, perform a confirmation operation (e.g., exits the barrier), and propagate packet 236 further downstream until the leaf nodes of tree 200 are reached. Because the confirmation operation is performed when all nodes have generated key 224, downstream nodes, such as nodes 204 and 206, can discard key 222.

If a replay attack is attempted by capturing packet 232, the encrypted data in packet 232 may not be valid after a while because key 222 associated with packet 232 may no longer be active. As a result, if packet 232 is replayed after the expiration of key 222, a node receiving the replayed packet 232 can determine that the current key is key 224 (or a subsequent key). The node can then discard replayed packet 232. Furthermore, by maintaining old key 222 before all nodes can transition to key 224, a respective node can ensure that a lost packet comprising data encrypted with key 222 can be retransmitted. In this way, the independent and distributed key refresh can mitigate a replay attack while utilizing collective operation 250 for key refresh in an efficient and distributed way.

Figure 2B:
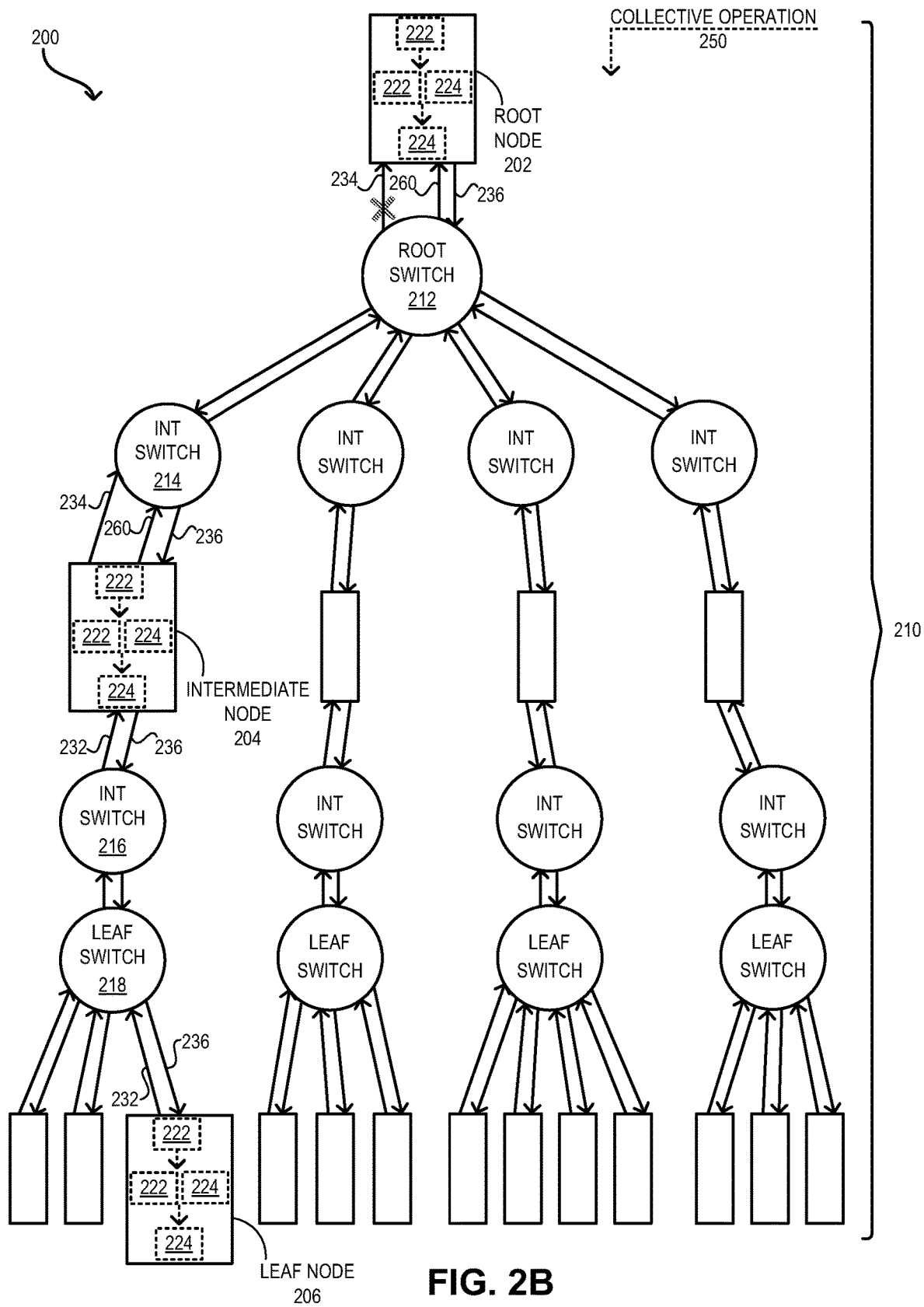
FIG. 2B illustrates an example of packet loss management while refreshing a key in a network for a distributed application, in accordance with an aspect of the present application.

FIG. 2B illustrates an example of packet loss management while refreshing a key in a network for a distributed application, in accordance with an aspect of the present application. If a packet, such as packet 234, associated with collective operation 250 is lost (denoted with a cross), lost packet 234 can time out based on the network protocol used to send packet 234. Node 204 can then send packet 260, which can be a retransmission instance of packet 234, to node 202. Since both keys are maintained until collective operation 250 has reached a threshold point, when packet 260 is sent, node 204 can use key 222 to encrypt the data in packet 260. Hence, node 202 can receive packet 260 and decrypt the payload using key 222. Therefore, maintaining both keys 222 and 224 until all nodes in tree 200 refresh key 22 can support the retransmission of lost packets.

Figure 3:
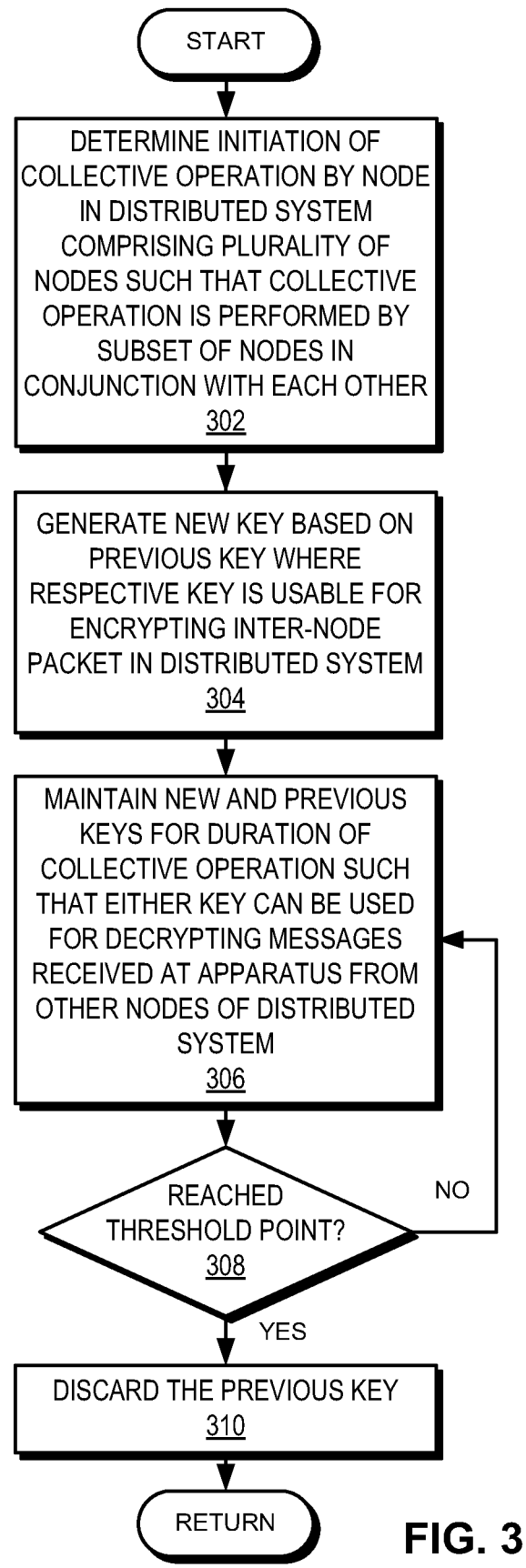
FIG. 3 presents a flowchart illustrating an example of a process of an apparatus of a node managing keys for a distributed application, in accordance with an aspect of the present application.

FIG. 3 presents a flowchart illustrating an example of a process of an apparatus of a node managing keys for a distributed application, in accordance with an aspect of the present application. During operation, the apparatus can determine the initiation of a collective operation by the node in a distributed system comprising a plurality of nodes such that the collective operation can be performed by a subset of the nodes in conjunction with each other (operation 302). Typically, a distributed application of the node initiates the collective operation. The apparatus can, based on an instruction, determine the initiation of the collective operation. The apparatus can generate a new key based on a previous key where a respective key is usable for encrypting an inter-node packet in the distributed system (operation 304). The apparatus can apply a cryptographic hash function on the previous key as an input and obtain the new key as an output.

The apparatus can maintain the new and previous keys for the duration of the collective operation such that either key can be used for decrypting messages received at the apparatus from other nodes of the distributed system (operation 306). The apparatus can keep both keys active. When a packet is received, the apparatus can determine which key of the new and previous keys is used to encrypt the data in the packet. The apparatus can then decrypt the data based on the determined key. The apparatus can determine whether the collective operation has reached a threshold point (operation 308). The threshold point can indicate the completion of a blocking collective operation or sufficient progress (e.g., completion of a particular computation) non-blocking collective operation. If the collective operation has reached the threshold point, the apparatus can discard the previous key (operation 310).

Figure 4A:
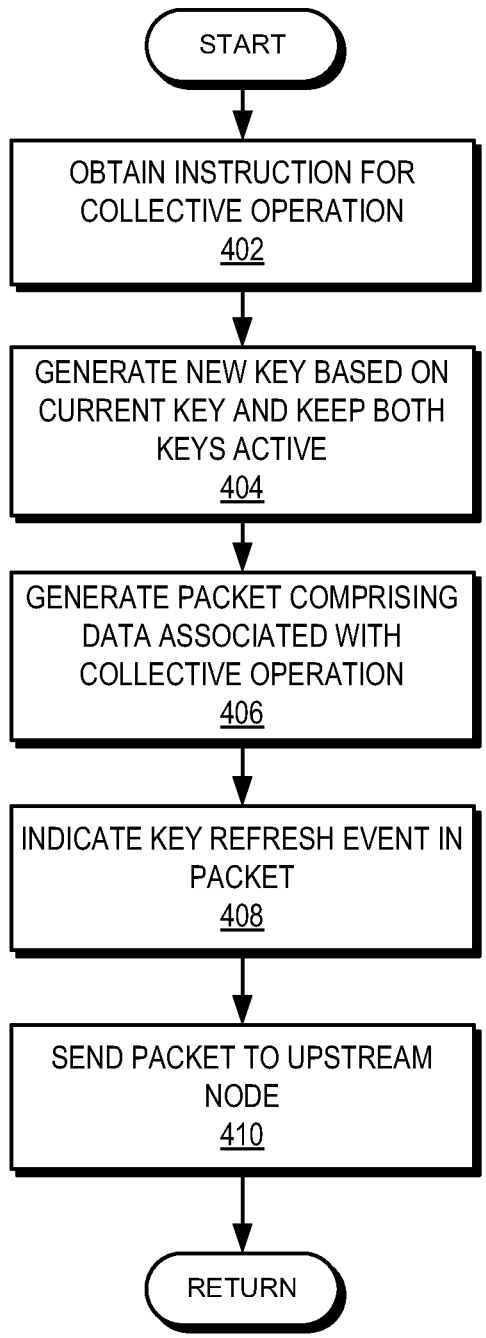
FIG. 4A presents a flowchart illustrating an example of a process of a node initiating key refresh for a distributed application, in accordance with an aspect of the present application.

FIG. 4A presents a flowchart illustrating an example of a process of a node initiating key refresh for a distributed application, in accordance with an aspect of the present application. During operation, the node can obtain an instruction for a collective operation (operation 402). The NIC of the node may receive the instruction from a distributed application running on the node. The distributed application can issue the instruction based on a hardware interrupt directed to the NIC. The node can then generate a new key based on the current key and keep both keys active (operation 404). The apparatus can apply a cryptographic hash function on the current key to generate the new key. The current key can then become the old key.

The node can then generate a packet comprising data associated with the collective operation (operation 406). If the collection operation is a barrier synchronization, the data can be NULL data and may not be encrypted. However, if the collection operation includes computation, the data can include the results of the local computations and may be encrypted using the current key. The node can also indicate the packet refresh in the packet (operation 408). The packet refresh can trigger the transition to the new key. Depending on the type of the collective operation, the packet itself can be the indicator. The node can then send the packet to the upstream node (operation 410).

Figure 4B:
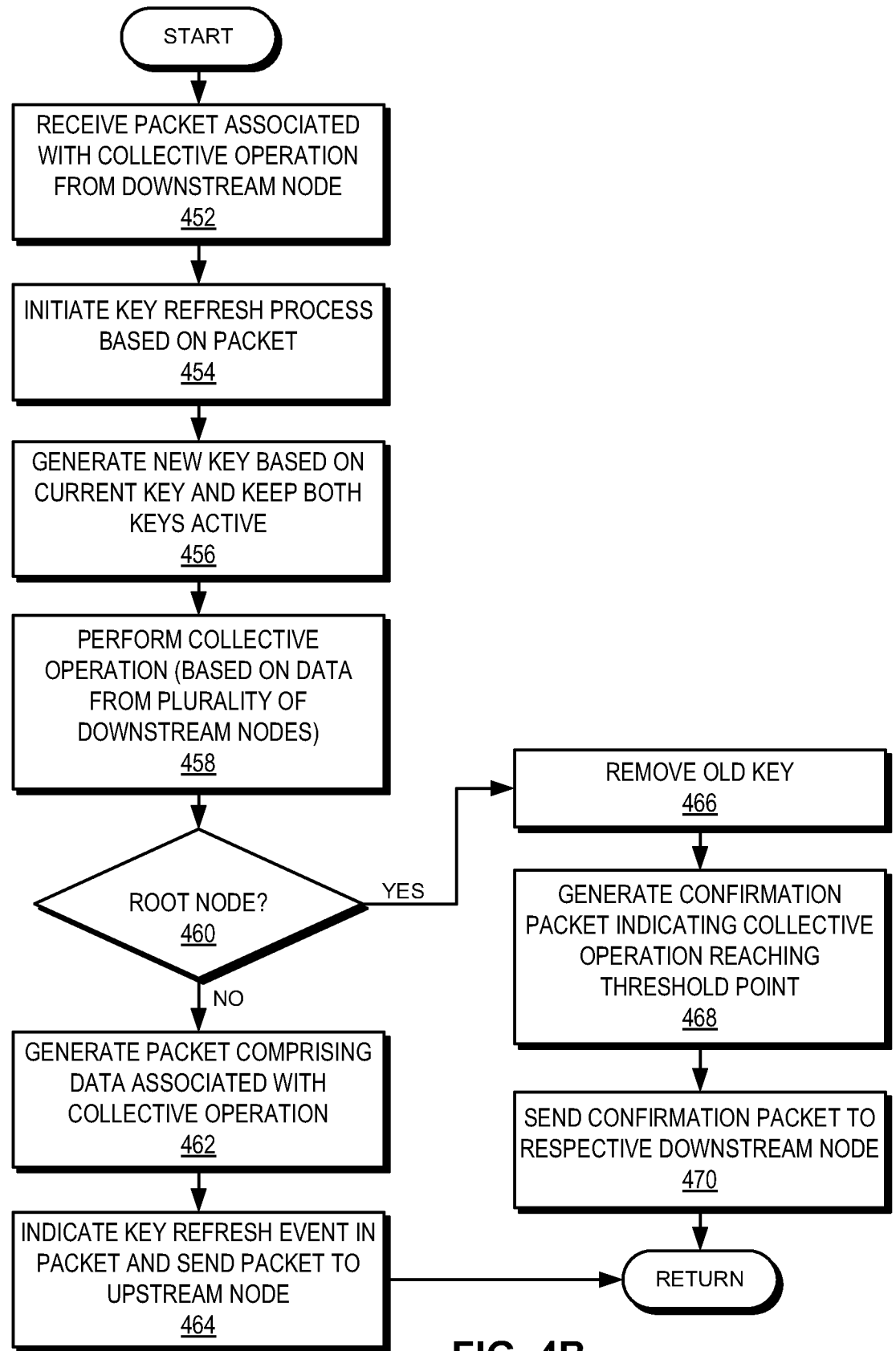
FIG. 4B presents a flowchart illustrating an example of a process of a node triggering key refresh for a distributed application, in accordance with an aspect of the present application.

FIG. 4B presents a flowchart illustrating an example of a process of a node triggering key refresh for a distributed application, in accordance with an aspect of the present application. During operation, the node can receive a packet associated with a collective operation from a downstream node (operation 452) and initiate the key refresh process based on the packet (operation 454). The node can initiate the key refresh process upon identifying an indicator in the packet. The indicator can be the packet itself or a value indicated in the packet. The node can then generate a new key based on the current key (e.g., using a cryptographic hash function) and keep both keys active (operation 456). While active, either key can be used to decrypt data in packets. The node can perform the collective operation (operation 458). If the collective operation includes computation, the node can perform the collective operation based on the data received from a plurality of downstream nodes.

The node can determine whether it is the root node (operation 460). If the node is not the root node, the node can generate a packet comprising the data associated with the collective operation (operation 462). For example, the node can include the result of the computation in the packet. The node can then indicate the packet refresh in the packet by including an indicator in the packet and send the packet to the upstream node (operation 464). On the other hand, if the node is the root node, the node can determine that all nodes of the collective operation have transitioned to the new key. Accordingly, the node can remove the old key (operation 466). The node can also generate a confirmation packet indicating the collective operation reaching a threshold point (operation 468) and send the confirmation packet to a respective downstream node (operation 470). The threshold point can indicate the completion of a blocking collective operation or a sufficient progress in a non-blocking collective operation.

Figure 5:
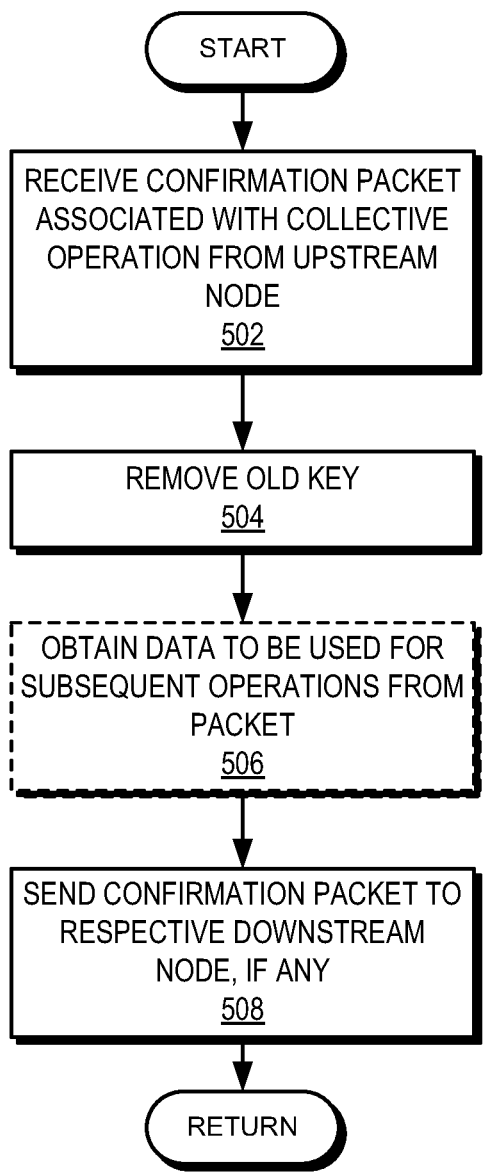
FIG. 5 presents a flowchart illustrating an example of a process of a node transitioning to a new key, in accordance with an aspect of the present application.

FIG. 5 presents a flowchart illustrating an example of a process of a node transitioning to a new key, in accordance with an aspect of the present application. During operation, the node can receive a confirmation packet associated with a collective operation from an upstream node (operation 502). The node can then remove the old key (operation 504). The confirmation packet notifies the node that the collective operation has reached the threshold point. If the packet includes any data to be used for subsequent operations, the node can obtain the data from the packet (operation 506) (denoted with dashed lines). The node can send the confirmation packet to a respective downstream node, if any (operation 508). In this way, the confirmation packet is propagated among the nodes participating the collective operation.

Figure 6:
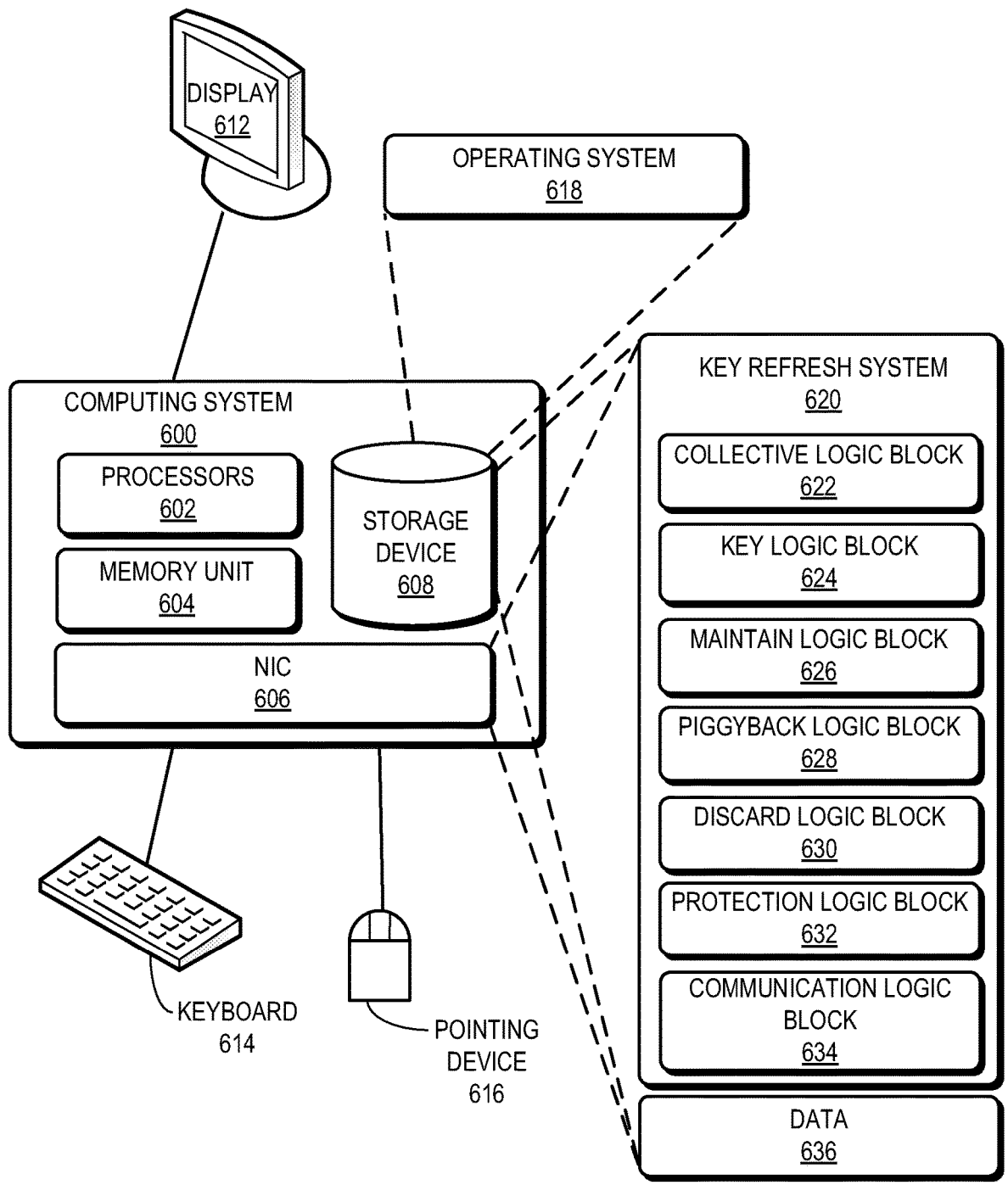
FIG. 6 illustrates an example of a computing system facilitating efficient key refresh for a distributed application, in accordance with an aspect of the present application.

FIG. 6 illustrates an example of a computing system facilitating efficient key refresh for a distributed application, in accordance with an aspect of the present application. A computing system 600 can include a set of processors 602, a memory unit 604, a NIC 606, and a storage device 608. Memory unit 604 can include a set of volatile memory devices (e.g., dual in-line memory module (DIMM)). Furthermore, computing system 600 may be coupled to a display device 612, a keyboard 614, and a pointing device 616, if needed. Storage device 608 can store an operating system 618. A key refresh system 620 and data 636 associated with key refresh system 620 can be maintained and executed from storage device 608 and/or NIC 606.

Key refresh system 620 can include instructions, which when executed by computing system 600 can cause computing system 600 to perform methods and/or processes described in this disclosure. Specifically, key refresh system 620 can include instructions for initiating and performing a collective operation (collective logic block 622). Key refresh system 620 can also include instructions for encrypting a piece of data associated with the collective operation (collective logic block 622). Furthermore, key refresh system 620 can include instructions for generating a new key based on an existing or old key using a cryptographic hash function (key logic block 624). In addition, key refresh system 620 can include instructions for encrypting and decrypting packets based on the new and old keys (key logic block 624).

Key refresh system 620 can also include instructions for maintaining both old and new keys as active keys (maintain logic block 626). Moreover, key refresh system 620 can include instructions for piggybacking a piece of information indicating the key refresh event in a packet (piggyback logic block 628). Key refresh system 620 can also include instructions for discarding the old key upon completion of the collective operation (discard logic block 630). Key refresh system 620 can also include instructions for reporting the discarding operation to an audit system, thereby providing information on a possible replay attack to the audit system. In addition, key refresh system 620 can also include instructions for discarding a packet comprising data encrypted with a discarded key (protection logic block 632). Key refresh system 620 may further include instructions for sending and receiving packets (communication logic block 634). Data 636 can include any data that can facilitate the operations of key refresh system 620. Data 636 can include, but is not limited to, current and old keys, a cryptographic hash function, data used for the collective operation, and data generated from the collective operation.

Figure 7:
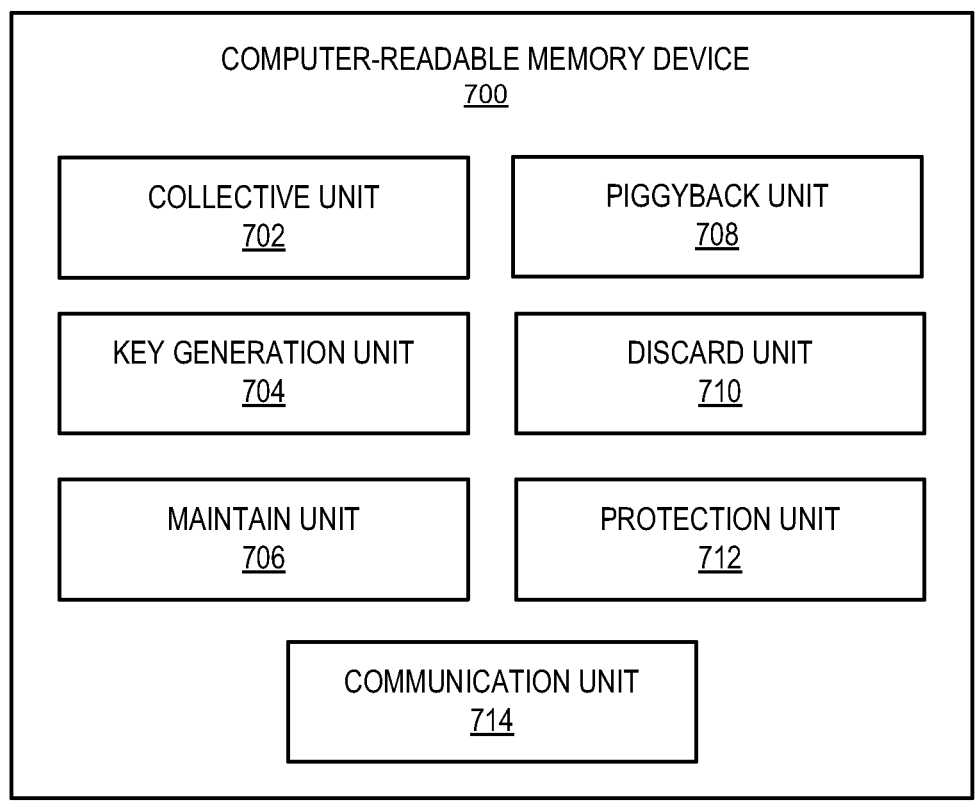
FIG. 7 illustrates an example of a non-transitory computer-readable memory device that facilitates efficient key refresh for a distributed application, in accordance with an aspect of the present application.

FIG. 7 illustrates an example of a non-transitory computer-readable memory device that facilitates efficient key refresh for a distributed application, in accordance with an aspect of the present application. Computer-readable memory device 700 can comprise a plurality of units or apparatuses which may communicate with one another via a wired, wireless, quantum light, or electrical communication channel. Computer-readable memory device 700 may be realized using one or more integrated circuits, and may include fewer or more units or apparatuses than those shown in FIG. 7.

Further, Computer-readable memory device 700 may be integrated in a computer system. For example, computer-readable memory device 700 can be in NIC in a computer system. Computer-readable memory device 700 can comprise units 702-714, which perform functions or operations similar to logic blocks 622-634 of key refresh system 620 of FIG. 6, including: a collective unit 702; a key unit 704, a maintain unit 706; a piggyback unit 708; a discard unit 710; a protection unit 712; and a communication unit 714.

The description herein is presented to enable any person skilled in the art to make and use the invention, and is provided in the context of a particular application and its requirements. Various modifications to the disclosed examples will be readily apparent to those skilled in the art, and the general principles defined herein may be applied to other examples and applications without departing from the spirit and scope of the present invention. Thus, the present invention is not limited to the examples shown, but is to be accorded the widest scope consistent with the claims.

One aspect of the present technology can provide a NIC of a node for facilitating efficient key refresh in the node. During operation, the NIC can determine that a collective operation is initiated by the node. The NIC can perform the collective operation in conjunction with a subset of a plurality of computing systems of the distributed system. The NIC can generate a new key based on a previous key operational at the NIC. The NIC can encrypt a first packet destined to another node in the distributed system based on the new key. The NIC can determine which key of the new and previous keys is used to encrypt a second packet received within the duration of the collective operation. The NIC can decrypt the second packet with the determined key. Upon determining that the collective operation has reached a threshold point, the NIC can discard the previous key. The threshold point can indicate the completion of a blocking collective operation or sufficient progress (e.g., completion of a particular computation) non-blocking collective operation.

In a variation on this aspect, the NIC can generate the new key by applying a cryptographic hash function to the previous key. Here, the new key can be an output of the cryptographic hash function.

In a variation on this aspect, the new key can be independently generated at a respective node of the distributed system.

In a variation on this aspect, the NIC can determine a piece of data associated with the collective operation. The NIC can then encrypt the piece of data using the previous key and send the encrypted piece of data in a packet to an upstream node.

In a further variation, the NIC can determine that the packet is lost. The NIC can then retransmit the packet to the upstream node. The piece of data in the retransmitted packet is encrypted using the previous key.

In a variation on this aspect, the NIC can receive, after discarding the previous key, a packet comprising data encrypted using the previous key. The NIC can then discard the packet, thereby preventing a replay attack using the packet.

In a variation on this aspect, the collective operation can include a blocking collective operation or a non-blocking collective operation, wherein the collective operation can include one of: a barrier, a bitwise AND operation, a bitwise OR operation, a bitwise XOR operation, a MINIMUM operation, a MAXIMUM operation, a MINIMUM/MAXIMUM with indexes operation, and a SUM operation.

In a variation on this aspect, the collective operation is performed by an application running on a respective node of the distributed system.

In a further variation, the NIC can receive an instruction from the application indicating the initiation of the collective operation.

In a variation on this aspect, the NIC can determine the threshold point of the collective operation by receiving a confirmation packet indicating a completion of the collective operation for a blocking collective operation or a sufficient progress of the collective operation for a non-blocking collective operation.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disks, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and codes and stored within the computer-readable storage medium.

The methods and processes described herein can be executed by and/or included in hardware logic blocks or apparatus. These logic blocks or apparatus may include, but are not limited to, an application-specific integrated circuit (ASIC) chip, a field-programmable gate array (FPGA), a dedicated or shared processor that executes a particular software logic block or a piece of code at a particular time, and/or other programmable-logic devices now known or later developed. When the hardware logic blocks or apparatus are activated, they perform the methods and processes included within them.

The foregoing descriptions of examples of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A method comprising:
   determining, by a network interface card (NIC) of a node in a distributed system comprising a plurality of nodes, that a collective operation, which is performed by a subset of the plurality of nodes in conjunction with each other, is initiated on the node;
   generating, by the NIC, a new key based on a previous key operational at the NIC;
   encrypting, by the NIC, a first packet destined to another node in the distributed system based on the new key;
   determining, at the NIC, which key of the new and previous keys is used to encrypt a second packet received within a duration of the collective operation;
   decrypting, at the NIC, the second packet with the determined key; and
   in response to determining that the collective operation has reached a threshold point, discarding the previous key.

2. The method of claim 1, wherein generating the new key further comprises applying a cryptographic hash function to the previous key, wherein the new key is an output of the cryptographic hash function.

3. The method of claim 1, wherein the new key is independently generated at a respective node of the distributed system.

4. The method of claim 1, further comprising:
   determining a piece of data associated with the collective operation;
   encrypting the piece of data using the previous key; and
   sending the encrypted piece of data in a packet to an upstream node.

5. The method of claim 4, further comprising:
   determining that the packet is lost; and
   retransmitting the packet to the upstream node, wherein the piece of data in the retransmitted packet is encrypted using the previous key.

6. The method of claim 1, further comprising:
   receiving, after discarding the previous key, a packet comprising data encrypted using the previous key; and
   discarding the packet at the NIC, thereby preventing a replay attack using the packet.

7. The method of claim 1, wherein the collective operation includes a blocking collective operation or a non-blocking collective operation, wherein the collective operation includes one of:
   a barrier;
   a bitwise AND operation;
   a bitwise OR operation;
   a bitwise XOR operation;
   a MINIMUM operation;
   a MAXIMUM operation;
   a MINIMUM/MAXIMUM with indexes operation; and
   a SUM operation.

8. The method of claim 1, wherein the collective operation is performed by an application running on a respective node of the distributed system.

9. The method of claim 8, further comprising receiving, by the NIC, an instruction from the application indicating the initiation of the collective operation.

10. The method of claim 1, wherein determining the threshold point of the collective operation further comprises receiving, by the NIC, a confirmation packet indicating a completion of the collective operation for a blocking collective operation or a sufficient progress of the collective operation for a non-blocking collective operation.

11. A computing system in a distributed system, comprising:
   a memory device;
   one or more ports; and
   a network interface controller (NIC) comprising:
   a collective logic block to:
      determine that a collective operation is initiated by the computing system; and
      perform the collective operation in conjunction with a subset of a plurality of computing systems of the distributed system; and
   a key logic block to:
      generate a new key based on a previous key operational at the NIC;
      encrypt a first packet destined to another computing system in the distributed system based on the new key;
      determine which key of the new and previous keys is used to encrypt a second packet received within a duration of the collective operation;

decrypt the second packet with the determined key; and a discard logic block to, in response to determining that the collective operation has reached a threshold point, discard the previous key.

12. The computing system of claim 11, wherein the key block generates the new key by applying a cryptographic hash function to the previous key, wherein the new key is an output of the cryptographic hash function.

13. The computing system of claim 11, wherein the new key is independently generated at a respective computing system of the distributed system.

14. The computing system of claim 11, wherein the collective logic block is further to determine a piece of data associated with the collective operation;

wherein the key logic block is to encrypt the piece of data using the previous key; and wherein the NIC further comprises a communication logic block to send the encrypted piece of data in a packet to an upstream computing system.

15. The computing system of claim 14, wherein the communication logic block is further to:

determine that the packet is lost; and retransmit the packet to the upstream computing system, wherein the piece of data in the retransmitted packet is encrypted using the previous key.

16. The computing system of claim 11, wherein the NIC further comprises:

a communication logic block is further to receive, after discarding the previous key, a packet comprising data encrypted using the previous key; and a protection logic block to discard the packet, thereby preventing a replay attack using the packet.

17. The computing system of claim 11, wherein the collective operation includes a blocking collective operation or a non-blocking collective operation, wherein the collective operation includes one of:

a barrier;

a bitwise AND operation;

a bitwise OR operation;

a bitwise XOR operation;

a MINIMUM operation;

a MAXIMUM operation;

a MINIMUM/MAXIMUM with indexes operation; and a SUM operation.

18. The computing system of claim 11, wherein the computing system receives an instruction from an application indicating the initiation of the collective operation, wherein the application runs on a respective computing system of the distributed system.

19. The computing system of claim 11, wherein the threshold point of the collective operation is determined in response to receiving, by the communication logic block, a confirmation packet indicating a completion of the collective operation for a blocking collective operation or a sufficient progress of the collective operation for a non-blocking collective operation.

20. A non-transitory computer readable storage medium comprising instructions which, when executed on a network interface controller (NIC) of a computing system in a distributed system, cause the NIC to:

determine that a collective operation is initiated by the computing system perform the collective operation in conjunction with a subset of a plurality of computing systems of the distributed system;

generate a new key based on a previous key operational at the NIC;

encrypt a first packet destined to another computing system in the distributed system based on the new key;

determine which key of the new and previous keys is used to encrypt a second packet received within a duration of the collective operation;

decrypt the second packet with the determined key; and in response to determining that the collective operation has reached a threshold point, discard the previous key.

* * * * *